March 30, 1943.  R. K. CUTTER  2,315,109
DRIP METER
Filed Aug. 23, 1940
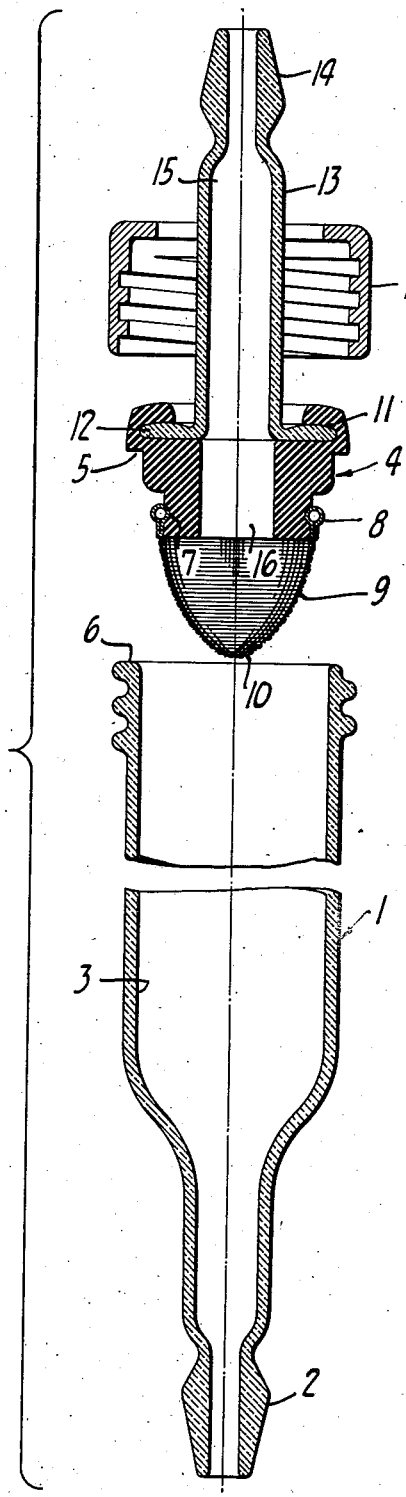
INVENTOR
Robert K. Cutter
BY
ATTORNEY Patented Mar. 30, 1943

2,315,109

UNITED STATES PATENT OFFICE 2,315,109

DRIP METER

Robert K. Cutter, Berkeley, Calif., assignor to Cutter Laboratories, Berkeley, Calif., a corporation of California Application August 23, 1940, Serial No. 353,789

5 Claims. (Cl. 210—164)

This invention relates to a drip meter particularly suitable in connection with making blood transfusions and is an improvement over the type of device shown in the Nesset Patent No. 2,186,987 of January 16, 1940.

When making blood transfusions it is obviously essential to use sterile equipment and highly desirable to use equipment which is not subject to breakage particularly when in actual use. The Nesset device comprises a glass tube 10 arranged to be inserted in a blood transfusion line. Formed integral with and intermediate the ends of this tube is an inwardly and downwardly extending drip tube 12, and formed at the lower end of the tube 10 is a nipple 11. Since the drip tube 12 and the nipple 11 provide only very restricted openings into the chamber defined by these members and the tube 10, it is extremely difficult to clean this chamber. The formation of the drip tube 12 integral with the tube 10 is, from a manufacturing standpoint, complicated and expensive. Furthermore, during the formation of such a structure certain stress and strain are set up at the juncture between the two tubes leaving the device weak at this zone and consequently subject to breakage.

In general, the object of this invention is the provision of a drip tube free from inaccessible chambers, weakened zones and manufacturing problems.

More specifically, the object of this invention is the provision of a drip-meter comprising a cylindrical tube, having unobstructed interior walls so that it can be readily cleaned and provided at its upper end with a closure member associated with a depending thimble shaped filter from which the blood delivered to the device can drip.

The invention possesses other advantageous features, some of which with the foregoing will be set forth at length in the following description where that form of the invention which has been selected for illustration in the drawings accompanying and forming a part of the present specification is outlined in full. In said drawing, one form of the invention is shown, but it is to be understood that it is not limited to such form, since the invention as set forth in the claims may be embodied in a plurality of forms.

Referring to the drawing, the single figure is an exploded cross-sectional view of a drip meter, embodying the objects of my invention.

The drip meter shown in this view comprises a cylindrical transparent glass tube 1, terminating at its lower end in a hose connection or nipple 2 and having unobstructed interior walls 3.

Associated with the upper end of the tube 1 is a closure member or rubber washer 4 formed with a shoulder 5 adapted to seat on the upper end 6 of the tube 1. The washer 4 is molded on its lower end with a channel 7 for the reception of an inwardly extending bead 8 formed on the upper edge of a thimble shaped filter 9, the apex 10 of which may be termed a teat. If desired, the apex of the filter may be in the form of a solid bead. In either case the blood passing through the filter drips from the apex and therefore such a structure serves as a metering device.

Formed on the upper end of washer 4 is an annular recess 11 for the reception of a radially extending flange 12 formed on the lower end of a tube 13. The upper end of the tube 13 is formed with a hose connection or nipple 14 and the passageway 15 of this tube is adapted to register with a central passageway 16 extending through the washer 4.

The washer 4 with its associated filter 9 is maintained in sealed relation over the upper end of the tube 1 by a screw cap 17 threaded to the upper end of the tube 1.

By a series of experiments I have found that by making the filter 9 in the form of a thimble terminating in a teat 10, blood passing through the filter collects at and drips from its teat in just as suitable a manner as from the drip tubes previously resorted to.

Obviously the hose connections or nipples 2 and 14 are simply one means by which the tube 1 may be introduced into the transfusion line. Other means can of course be used and in some cases it may be desirable to accomplish this purpose by connecting the upper end of the tube 1 directly to the outer end of the stopper of the blood transfusion flask rather than indirectly by means of the nipple 14 and an intermediate section of rubber tubing.

In actual use a drip meter of this type invariably assumes an inclined position and for this reason my thimble shaped form of filter is particularly advantageous. Regardless of the inclination of the device, blood in passing through it collects in drops on the lower surface of the filter at a point spaced from the walls of the tube. By this arrangement, the drops when completely formed are free to fall from the lower end of the filter to the walls of the tube and in so doing may be readily counted, whereas in the form of meter illustrated in the Nesset patent the blood passing through the filter bridges the gap between the filter and the tube, flows down the walls of the tube, and can be metered in the form of drops only by the aid of an additional drip tube.

From the above description it is apparent that I have provided a drip meter having all of the advantages of those previously in use and having none of their disadvantages. The device can be readily assembled, disassembled and thoroughly cleaned, is free from weakened zones and is therefore not subject to the former danger of breakage, and is free from manufacturing problems.

I claim:

1. A drip meter adapted to be used in a vertical position for making transfusions, comprising: a transparent tube formed with substantially unobstructed inner walls; a downwardly converging filter sealed within said tube; means for establishing communication between the upper end of said tube and a source of liquid; and means for establishing communication between the lower end of said tube and an injection needle.

2. A drip meter adapted to be used in a vertical position for making transfusions, comprising: a transparent tube formed with substantially unobstructed interior walls and provided at one end with a hose connection; resilient closure means for sealing off the opposite end of said tube; a downwardly converging filter secured to the inner end of said closure means; an undercut annular channel formed in the outer end of said closure means; and a flanged hose fitting resiliently secured to said closure means within said channel.

3. A drip meter adapted to be used in a vertical position for making transfusions, comprising: a transparent tube provided at one end with a hose connection and having substantially unobstructed inner walls; resilient closure means for sealing off the opposite end of said tube; an annular channel formed in the inner end of said closure means; a tapered filter secured to said closure means by a bead formed on the periphery of said filter and resiliently engaged within said channel; an undercut annular channel formed in the outer end of said closure means; a flanged hose fitting resiliently secured within said channel; and a screw cap disposed over said closure means and threaded to said tube so as to lock said closure means to said tube.

4. A filter and drip meter device adapted to be used in a vertical position for making transfusions, comprising: a tubular member formed with transparent walls; and a filter sealed within said tubular member so that no fluid can pass through said member without first passing through said filter, the lower end of said filter being downwardly converging so as to cause a liquid slowly flowing through said device to form discrete drops on the downwardly converging end of said filter, and the downwardly converging end of said filter being sufficiently spaced from the inner walls of said tubular member so that no liquid can pass from the lower downwardly converging end of said filter to the walls of said member without first forming into discrete drops.

5. A filter and drip meter device adapted to be used in a vertical position for making transfusions, comprising: a transparent tubular member provided with unobstructed inner walls; and a filter sealed within said tubular member so that no fluid can pass through said member without first passing through said filter, the lower end of said filter being downwardly converging so as to cause a liquid slowly flowing through said device to form discrete drops on the downwardly converging end of said filter, and the downwardly converging end of said filter being sufficiently spaced from the inner walls of said tubular member so that no liquid can pass from the lower downwardly converging end of said filter to the walls of said member without first forming into discrete drops.

ROBERT K. CUTTER.